(12) United States Patent
Foley et al.

(10) Patent No.: US 10,073,621 B1
(45) Date of Patent: Sep. 11, 2018

(54) MANAGING STORAGE DEVICE MAPPINGS IN STORAGE SYSTEMS

(71) Applicant: EMC Corporation, Hopkinton, MA (US)

(72) Inventors: Robert P. Foley, Clinton, MA (US); Peter Puhov, Shrewsbury, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 15/086,593

(22) Filed: Mar. 31, 2016

(51) Int. Cl.
*G06F 12/00* (2006.01)
*G06F 13/00* (2006.01)
(Continued)

(52) U.S. Cl.
CPC .......... *G06F 3/0604* (2013.01); *G06F 3/0644* (2013.01); *G06F 3/0689* (2013.01)

(58) Field of Classification Search
CPC ........ G06F 3/06; G06F 3/0601; G06F 3/0602; G06F 3/0604; G06F 3/0605; G06F 3/0607; G06F 3/0631; G06F 3/0638; G06F 3/064; G06F 3/0641; G06F 3/0643; G06F 3/0644; G06F 3/0646; G06F 3/0647; G06F 3/0649; G06F 3/065; G06F 3/0652; G06F 3/0653; G06F 3/0655; G06F 3/0656; G06F 3/0658; G06F 3/0659; G06F 3/0661; G06F 3/0664; G06F 3/0668; G06F 3/0671; G06F 3/0673; G06F 3/0676; G06F 3/0677; G06F 3/0679; G06F 3/068; G06F 3/0682; G06F 3/0683; G06F 3/0685; G06F 3/0686; G06F 3/0688; G06F 3/0689; G06F 9/46; G06F 9/50–9/5094; G06F 11/30–11/3495; G06F 12/00; G06F 12/02; G06F 12/0223; G06F 12/023; G06F 12/0238; G06F 12/0246; G06F 12/0284; G06F 12/0292; G06F 12/04; G06F 12/06; G06F 12/08; G06F 12/10; G06F 12/1009; G06F 12/1018; G06F 13/00–13/4295; G06F 2003/0691;
(Continued)

(56) References Cited

U.S. PATENT DOCUMENTS 5,829,053 A * 10/1998 Smith .................... G06F 3/0607
  711/202
5,875,456 A * 2/1999 Stallmo ................. G06F 3/0607
  711/114
(Continued)

OTHER PUBLICATIONS

CD-RAIS: Constrained dynamic striping in redundant array of independent SSDs; Du et al.; IEEE International Conference on Cluster Computing; Sep. 22-26, 2014; pp. 212-220 (Year: 2014).*
(Continued)

*Primary Examiner* — Daniel C Chappell
(74) *Attorney, Agent, or Firm* — Krishnendu Gupta

(57) ABSTRACT

A method is used in managing storage device mappings in storage systems. A set of mappings is created in a distributed storage system. The distributed storage system stores data in a redundant manner at more than one location on a set of storage devices by using a set of stripes. Each stripe of the set of stripes indicates a data slice stored on a storage device. Each mapping of the set of mappings identifies information regarding location of data on a storage device for a stripe. The mapping is stored on the set of storage devices.

14 Claims, 6 Drawing Sheets

(51) Int. Cl.
*G06F 13/28* (2006.01)
*G06F 3/06* (2006.01)

(58) Field of Classification Search
CPC ..... G06F 2003/0692; G06F 2003/0694; G06F 2003/0695; G06F 2003/0697; G06F 2003/0698; G06F 2211/00–2211/902; G06F 2212/00–2212/7211; G11B 27/327
See application file for complete search history.

(56) References Cited

U.S. PATENT DOCUMENTS

| | | | | |
|---|---|---|---|---|
| 5,933,834 | A * | 8/1999 | Aichelen | G06F 3/0613 348/E5.008 |
| 5,974,503 | A * | 10/1999 | Venkatesh | G06F 11/1076 348/E5.008 |
| 6,052,759 | A * | 4/2000 | Stallmo | G06F 3/0607 711/114 |
| 6,058,489 | A * | 5/2000 | Schultz | G06F 3/0626 714/6.32 |
| 6,115,788 | A * | 9/2000 | Thowe | G06F 3/0613 711/111 |
| 6,145,028 | A * | 11/2000 | Shank | G06F 3/0607 710/31 |
| 6,223,269 | B1 * | 4/2001 | Blumenau | G06F 3/061 707/999.202 |
| 6,275,898 | B1 * | 8/2001 | DeKoning | G06F 3/0605 711/114 |
| 6,487,636 | B1 * | 11/2002 | Dolphin | G06F 11/1076 711/114 |
| 6,681,310 | B1 * | 1/2004 | Kusters | G06F 3/0626 707/999.102 |
| 6,839,827 | B1 * | 1/2005 | Beardsley | G06F 3/0605 711/114 |
| 7,603,529 | B1 * | 10/2009 | MacHardy | G06F 3/0608 707/999.202 |
| 7,624,231 | B2 * | 11/2009 | Berg | G06F 12/0806 707/999.01 |
| 7,774,575 | B2 * | 8/2010 | Seto | G06F 3/0605 711/100 |
| 9,417,955 | B2 * | 8/2016 | Patterson, III | G06F 11/1076 |
| 9,946,471 | B1 * | 4/2018 | More | G06F 3/0616 |
| 2002/0124137 | A1 * | 9/2002 | Ulrich | G06F 3/0613 711/113 |
| 2002/0156973 | A1 * | 10/2002 | Ulrich | G06F 9/5083 711/114 |
| 2008/0126695 | A1 * | 5/2008 | Berg | G06F 12/0806 711/113 |
| 2010/0199036 | A1 * | 8/2010 | Siewert | G06F 3/0613 711/112 |
| 2013/0275653 | A1 * | 10/2013 | Ranade | G06F 3/0605 711/103 |
| 2014/0089630 | A1 * | 3/2014 | Pignatelli | G06F 12/1009 711/206 |
| 2016/0054920 | A1 * | 2/2016 | Patterson, III | G06F 3/0604 714/766 |
| 2016/0062837 | A1 * | 3/2016 | Slik | G06F 11/1076 714/6.24 |
| 2016/0364181 | A1 * | 12/2016 | McGlaughlin | G06F 11/1012 |
| 2017/0024142 | A1 * | 1/2017 | Watanabe | G06F 3/06 |

OTHER PUBLICATIONS

DSC: Dynamic stripe construction for asynchronous encoding in clustered file system; Wei et al.; IEEE Conference on Computer Communications; May 1-4, 2017 (Year: 2017).*

Rabbet: Using Layout-Aware Backup for RAID Reconstruction; Zhu et al.; Chinese Journal of Electronics, vol. 26, iss. 4; Jul. 2017; pp. 710-719 (Year: 2017).*

Improving SSD reliability with RAID via Elastic Striping and Anywhere Parity; Kim et al.; IEEE/IFIP International Conference on Dependable Systems and Networks; Jun. 24-27, 2013 (Year: 2013).*

* cited by examiner

MANAGING STORAGE DEVICE MAPPINGS IN STORAGE SYSTEMS

BACKGROUND

Technical Field

This application relates to managing storage device mappings in storage systems.

Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

Such a data storage system typically includes processing circuitry and a set of disk drives (disk drives are also referred to herein as simply "disks" or "drives"). In general, the processing circuitry performs load and store operations on the set of disk drives on behalf of the host devices. In certain data storage systems, the disk drives of the data storage system are distributed among one or more separate disk drive enclosures (disk drive enclosures are also referred to herein as "disk arrays" or "storage arrays") and processing circuitry serves as a front-end to the disk drive enclosures. The processing circuitry presents the disk drive enclosures to the host device as a single, logical storage location and allows the host device to access the disk drives such that the individual disk drives and disk drive enclosures are transparent to the host device.

Disk arrays are typically used to provide storage space for one or more computer file systems, databases, applications, and the like. For this and other reasons, it is common for disk arrays to be structured into logical partitions of storage space, called logical units (also referred to herein as LUs or LUNs). For example, at LUN creation time, storage system may allocate storage space of various storage devices in a disk array to be presented as a logical volume for use by an external host device. This allows a disk array to appear as a collection of separate file systems, network drives, and/or volumes.

Disk arrays may also include groups of physical disks that are logically bound together to represent contiguous data storage space for applications. For example, disk arrays may be divided into redundant array of inexpensive disks (RAID) groups, which are disk arrays created by logically binding individual physical disks together to form the RAID groups. RAID groups represent a logically contiguous address space distributed across a set of physical disks. Each physical disk is subdivided into pieces used to spread the address space of the RAID group across the group (along with parity information if applicable to the RAID level). The physically contiguous pieces of the physical disks that are joined together to create the logically contiguous address space of the RAID group are called stripes. Stripes may form blocks and blocks may be allocated to create logical representations of storage space for use by applications within a data storage system.

As described above, applications access and store data incrementally by use of logical storage array partitions, known as logical units (LUNs). LUNs are made up of collections of storage blocks of a RAID array and are exported from the RAID array for use at the application level.

There are a number of different RAID (Redundant Array of Independent or Inexpensive Disks) levels and techniques that may be used in connection with providing a combination of fault tolerance and/or improved performance for data storage devices. Different RAID levels (e.g., RAID-1, RAID-5, RAID-6, and the like) may provide varying degrees of fault tolerance. Further, RAID parity schemes may be utilized to provide error detection during the transfer and retrieval of data across a storage system.

Generally, a RAID system is an array of multiple disk drives which appears as a single drive to a data storage system. A goal of a RAID system is to spread, or stripe, a piece of data uniformly across disks (typically in units called chunks), so that a large request can be served by multiple disks in parallel. For example, RAID-5 techniques can be used in connection with a data storage system to protect from a single device failure.

In a particular RAID-5 context, for example, which comprises a storage array of five disk modules, each disk has a plurality of "N" data storage sectors, corresponding sectors in each of the five disks being usually referred to as a "stripe" of sectors. With respect to any stripe, 80% of the sector regions in the stripe (i.e., in a 5 disk array effectively 4 out of 5 sectors) is used for user data and 20% thereof (i.e., effectively 1 out of 5 sectors) is used for redundant, or parity, data. The use of such redundancy allows for the reconstruction of user data in the event of a failure of a user data sector in the stripe.

When a user data disk module fails, the redundant or parity entry that is available in the parity sector of a stripe and the data in the non-failed user data sectors of the stripe can be used to permit the user data that was in the sector of the failed disk to be effectively reconstructed so that the system can remain operative using such reconstructed data even when the user data of that sector of the failed disk cannot be accessed. The system is then said to be operating in a "degraded" mode since extra processing operations and, accordingly, extra time is required to reconstruct the data in the failed disk sector when access thereto is required.

As described above, data storage systems may utilize a number of different RAID levels and techniques in connection with providing a combination of fault tolerance and/or improved performance for data storage drives. For example, the first level, RAID-0, combines two or more drives to create a larger virtual disk. In a dual drive RAID-0 system one disk contains the low numbered sectors or blocks and the other disk contains the high numbered sectors or blocks, forming one complete storage space. RAID-0 systems generally interleave the sectors of the virtual disk across the component drives, thereby improving the bandwidth of the combined virtual disk. Interleaving the data in that fashion is referred to as striping. RAID-0 systems provide no redundancy of data, so if a drive fails or data becomes corrupted, no recovery is possible short of backups made prior to the failure.

RAID-1 systems include one or more disks that provide redundancy of the virtual disk. One disk is required to contain the data of the virtual disk, as if it were the only disk of the array. One or more additional disks contain the same data as the first disk, providing a "mirror" of the data of the virtual disk. A RAID-1 system will contain at least two disks, the virtual disk being the size of the smallest of the component disks. A disadvantage of RAID-1 systems is that a write operation must be performed for each mirror disk, reducing the bandwidth of the overall array. In a dual drive RAID-1 system, the first disk and the second disk contain the same sectors or blocks, each disk holding exactly the same data.

RAID-2 systems provide for error correction through hamming codes. The component drives each contain a particular bit of a word, or an error correction bit of that word. RAID-2 systems automatically and transparently detect and correct single-bit defects, or single drive failures, while the array is running. Although RAID-2 systems improve the reliability of the array over other RAID types, they are less popular than some other systems due to the expense of the additional drives, and redundant onboard hardware error correction.

RAID-4 systems are similar to RAID-0 systems, in that data is striped over multiple drives. For example, the storage spaces of two disks are added together in interleaved fashion, while a third disk contains the parity of the first two disks. RAID-4 systems are unique in that they include an additional disk containing parity. For each byte of data at the same position on the striped drives, parity is computed over the bytes of all the drives and stored to the parity disk. The XOR operation is used to compute parity, providing a fast and symmetric operation that can regenerate the data of a single drive, given that the data of the remaining drives remains intact. RAID-3 systems are essentially RAID-4 systems with the data striped at byte boundaries, and for that reason RAID-3 systems are generally slower than RAID-4 systems in most applications. RAID-4 and RAID-3 systems therefore are useful to provide virtual disks with redundancy, and additionally to provide large virtual drives, both with only one additional disk drive for the parity information. They have the disadvantage that the data throughput is limited by the throughput of the drive containing the parity information, which must be accessed for every read and write operation to the array.

RAID-5 systems are similar to RAID-4 systems, with the difference that the parity information is striped over all the disks with the data. For example, first, second, and third disks may each contain data and parity in interleaved fashion. Distributing the parity data generally increases the throughput of the array as compared to a RAID-4 system. RAID-5 systems may continue to operate though one of the disks has failed. RAID-6 systems are like RAID-5 systems, except that dual parity is kept to provide for normal operation if up to the failure of two drives.

Combinations of RAID systems are also possible. For example, a four disk RAID 1+0 system provides a concatenated file system that is also redundant. The first and second disks are mirrored, as are the third and fourth disks. The combination of the mirrored sets forms a storage space that is twice the size of one individual drive, assuming that all four are of equal size. Many other combinations of RAID systems are possible.

It will be appreciated from the foregoing that techniques for managing storage devices in connection with RAID groups can be complex. It is, therefore, desirable to provide less complex techniques for managing data storage in connection with RAID groups.

SUMMARY OF THE INVENTION

A method is used in managing storage device mappings in storage systems. A set of mappings is created in a distributed storage system. The distributed storage system stores data in a redundant manner at more than one location on a set of storage devices by using a set of stripes. Each stripe of the set of stripes indicates a data slice stored on a storage device. Each mapping of the set of mappings identifies information regarding location of data on a storage device for a stripe. The mapping is stored on the set of storage devices.

BRIEF DESCRIPTION OF THE DRAWINGS

Features and advantages of the present technique will become more apparent from the following detailed description of exemplary embodiments thereof taken in conjunction with the accompanying drawings in which.

DETAILED DESCRIPTION OF EMBODIMENT(S)

Figure 1:
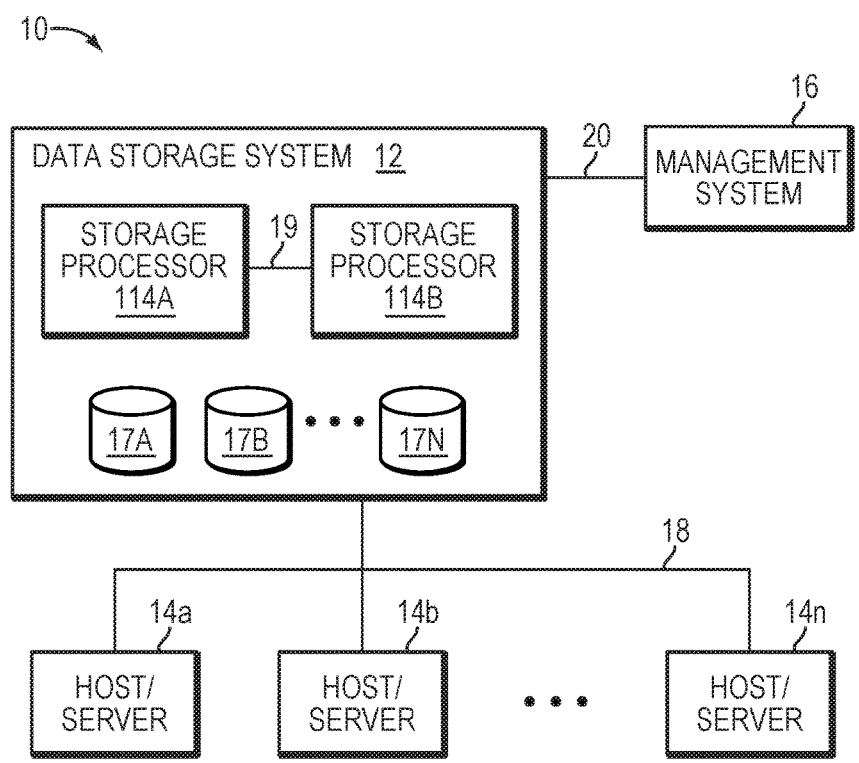
FIGS. 1-2 are examples of an embodiment of a computer system that may utilize the techniques described herein.

Described below is a technique for use in managing storage device mappings in storage systems, which technique may be used to provide, among other things, creating a set of mappings in a distributed storage system, where the distributed storage system stores data in a redundant manner at more than one location on a set of storage devices by using a set of stripes, each stripe of the set of stripes indicating a data slice stored on a storage device, where each mapping of the set of mappings identifies information regarding location of data on a storage device for a stripe, and storing the mapping on the set of storage devices.

As described herein, RAID (Redundant Array of Independent Disks) provides a way of storing the same data in different places thereby creating redundancy on multiple storage disks.

By placing data on multiple storage disks, input/output (I/O) operations can overlap in a balanced way thereby improving performance. Further, storing data redundantly on multiple storage disks also increases fault tolerance. Generally, RAID is a data storage virtualization technology that combines multiple physical disk drive components into a single logical unit for the purposes of data redundancy, performance improvement, or both.

Conventionally, disk drives are statically mapped in a RAID group in such a way that it is difficult or impossible to dynamically change mapping (or association) between the disk drives and the RAID group. Thus, in such a conventional case, a storage system is unable to increase storage capacity of a RAID group as the storage system is not able to add additional disks to the RAID group due to static mapping between disks and the RAID group which cannot be changed without rebuilding the entire RAID group. Thus, in such a conventional system, performance of a RAID group does not change and remains fixed. Consequently, in such a conventional system, a storage system distributes I/O load across multiple RAID groups in order to leverage performance from additional disk drives.

By contrast, in at least some implementations in accordance with the technique as described herein, a new dynamic mapping is used to map disk drives to a RAID group for describing the layout of data across distributed RAID system. In at least one embodiment of the current technique, a distributed RAID system enables RAID stripes to be dynamically mapped to a set of disk drives. Thus, in contrast to a conventional system in which mapping between disk drives and a RAID group is fixed and cannot be changed, the current technique provides an ability to map any RAID stripe in a storage tier across any disk drive within the storage tier and at any offset within that tier.

In at least one embodiment of the current technique, a distributed RAID system uses a plan that identifies disk drives and offsets within a specific RAID stripe. Further, a set of plans for a set of stripes are stored on disk drives such that a plan for a specific RAID stripe is stored on each disk drive that includes that specific RAID stripe. Further, in at least one embodiment of the current technique, identifying information regarding a specific disk drive within a RAID group is persistently stored on a device map thereby enabling a plan to have knowledge of identity of each of the disk drives included in the plan. Further, a device map may be a separate database from a set of plans. Further, in at least one embodiment of the current technique, a tier table is used for organizing information (e.g., capacity, number of drives) regarding each tier in a data storage system. Further, a tier table may be stored persistently on a data storage system. Thus, data stored in a tier table enables a storage system to have information regarding each tier even when disk drives of a tier are not present in the tier.

In at least some implementations in accordance with the current technique as described herein, the use of the managing storage device mappings in storage systems technique can provide one or more of the following advantages: improving efficiency of a storage system by efficiently mapping storage resources such as stripes in a RAID group organized on the storage system, improving performance in a storage system by dynamically mapping disk drives in a RAID group, improving performance efficiency of a RAID storage system by using a plan to create flexibility in assigning drives to a RAID group, allowing drive mappings to be dynamically discovered without relying on any single central database, and enabling features such as distributed I/O load, distributed rebuild of drives, ability to manage arbitrary numbers of drives in a tier, distributed sparing of disk drives, and dynamic rebalancing across of data new disk drives in a RAID group.

It should be noted that the terms "data storage system", "storage system", disk array", and "storage array" have been used interchangeably in this specification.

FIG. 1 depicts an example embodiment of a system that may be used in connection with performing the techniques described herein. The system 10 includes one or more data storage systems 12 connected to server or host systems 14a-14n through communication medium 18. The system 10 also includes a management system 16 connected to one or more data storage systems 12 through communication medium 2. In this embodiment of the system 10, the management system 16, and the N servers or hosts 14a 14n may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 2 may be a network connection, bus, and/or other type of data link, such as a hardwire or other connections known in the art. For example, the communication medium 18 may be the Internet, an intranet, network or other wireless or other hardwired connection(s) by which the host systems 14a 14n may access and communicate with the data storage systems 12, and may also communicate with other components (not shown) that may be included in the system 10. In one embodiment, the communication medium 2 may be a LAN connection and the communication medium 18 may be an iSCSI, Fibre Channel, Serial Attached SCSI, or Fibre Channel over Ethernet connection.

Each of the host systems 14a-14n and the data storage systems 12 included in the system 10 may be connected to the communication medium 18 by any one of a variety of connections as may be provided and supported in accordance with the type of communication medium 18. Similarly, the management system 16 may be connected to the communication medium 2 by any one of variety of connections in accordance with the type of communication medium 2. The processors included in the host computer systems 14a-14n and management system 16 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage systems 12 are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 2, a variety of different communication protocols may be used such as SCSI, Fibre Channel, iSCSI, and the like. Some or all of the connections by which the hosts, management system, and data storage system may be connected to their respective communication medium may pass through other communication devices, such as switching equipment that may exist such as a phone line, a repeater, a multiplexer or even a satellite. In one embodiment, the hosts may communicate with the data storage systems over an iSCSI or a Fibre Channel connection and the management system may communicate with the data storage systems over a separate network connection using TCP/IP. It should be noted that although FIG. 1 illustrates communications between the hosts and data storage systems being over a first connection, and communications between the management system and the data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the data storage systems 12 to perform a data operation. For example, an application executing on one of the host computers 14a-14n may perform a read or write operation resulting in one or more data requests to the data storage system s 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 16, provision data storage system resources, and the like.

In one embodiment, the data storage systems 12 may include one or more data storage systems such as one or more of the data storage systems, such as data storage arrays, offered by EMC Corporation of Hopkinton, Mass. Each of the data storage systems may include one or more data storage devices 17a-17n. Unless noted otherwise, data storage devices may be used interchangeably herein to refer to hard disk drive, solid state drives, and/or other known storage devices. One or more data storage systems may be manufactured by one or more different vendors. Each of the data storage systems included in 12 may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 12. It should be noted that each of the data storage systems may operate stand-alone, or may also be included as part of a storage area network (SAN) that includes, for example, other components such as other data storage systems. The particular data storage systems and examples as described herein for purposes of illustration should not be construed as a limitation. Other types of commercially available data storage systems, as well as processors and hardware controlling access to these particular devices, may also be included in an embodiment.

In such an embodiment in which element 12 of FIG. 1 is implemented using one or more data storage systems, each of the data storage systems may include code thereon for performing the techniques as described herein.

Servers or host systems, such as 14a-14n, provide data and access control information through channels to the storage systems, and the storage systems may also provide data to the host systems also through the channels. The host systems may not address the disk drives of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive. Data in a single storage system may be accessed by multiple hosts allowing the hosts to share the data residing therein. An LV or LUN (logical unit number) may be used to refer to the foregoing logically defined devices or volumes.

The data storage system may be a single unitary data storage system, such as single data storage array, including two storage processors or compute processing units. Techniques herein may be more generally use in connection with any one or more data storage system each including a different number of storage processors than as illustrated herein. The data storage system 12 may be a data storage array, such as a VNX™ or VNXe™ data storage array by EMC Corporation of Hopkinton, Mass., including a plurality of data storage devices 17a-17n and two storage processors 114A, 114B. The storage processors 114A, 114B may include a central processing unit (CPU) and memory and ports (not shown) for communicating with one or more physical or virtual hosts 14A-14N. The storage processor may be communicatively coupled via a communication medium such as storage processor bus 19. The storage processor units may be included in the data storage system 12 for processing requests and commands. In connection with performing techniques herein, an embodiment of the data storage system may include multiple storage processors including more than two storage processors as described. The VNX™ or VNXe™ data storage system mentioned above may include two storage processors 114A, 114B for performing processing in connection with servicing requests. Additionally, the two storage processors 114A, 114B may be used in connection with failover processing when communicating with the management system 16. Client software on the management system 16 may be used in connection with performing data storage system management by issuing commands to the data storage system 12 and/or receiving responses from the data storage system 12 over connection 2. In one embodiment, the management system 16 may be a laptop or desktop computer system.

The particular data storage system as described in this embodiment, or a particular device thereof, such as a disk, should not be construed as a limitation. Other types of commercially available data storage systems, as well as processors and hardware controlling access to these particular devices, may also be included in an embodiment.

In some arrangements, the data storage system 12 provides block-based storage by storing the data in blocks of logical storage units (LUNs) or volumes and addressing the blocks using logical block addresses (LBAs). In other arrangements, the data storage system 12 provides file-based storage by storing data as files of a file system and locating file data using inode structures. In yet other arrangements, the data storage system 12 stores LUNs and file systems, stores file systems within LUNs, and so on.

The two storage processors 114A, 114B (also referred to herein as "SP") may control the operation of the data storage system 12. The processors may be configured to process requests as may be received from the hosts, other data storage systems, management system, and other components connected thereto. Each of the SPs may process received requests and operate independently and concurrently with respect to the other processor. With respect to data storage management requests, operations, and the like, as may be received from a client, such as the management system 16 of FIG. 1 in connection with the techniques herein, the client may interact with a designated one of the two SPs. Upon the occurrence of failure of one the SPs, the other remaining SP may handle all processing typically performed by both SPs.

Storage operations performed in a data storage system 12 may include I/O operations which are received by the data storage system 12 from an external client, such as a host. Depending on the data storage configuration, the single host I/O operation, such as for a write operation, may result in more than one write operation to one or more physical drives on the data storage system. For example, if the host write is directed to a logical device, such as a LUN, having storage provisioned from a RAID group having a RAID-1 mirroring configuration with two physical drives, then a single front end or host I/O to the LUN results in two back-end physical device writes to each of the two mirrored physical devices of the storage system comprising the RAID group.

Figure 2:
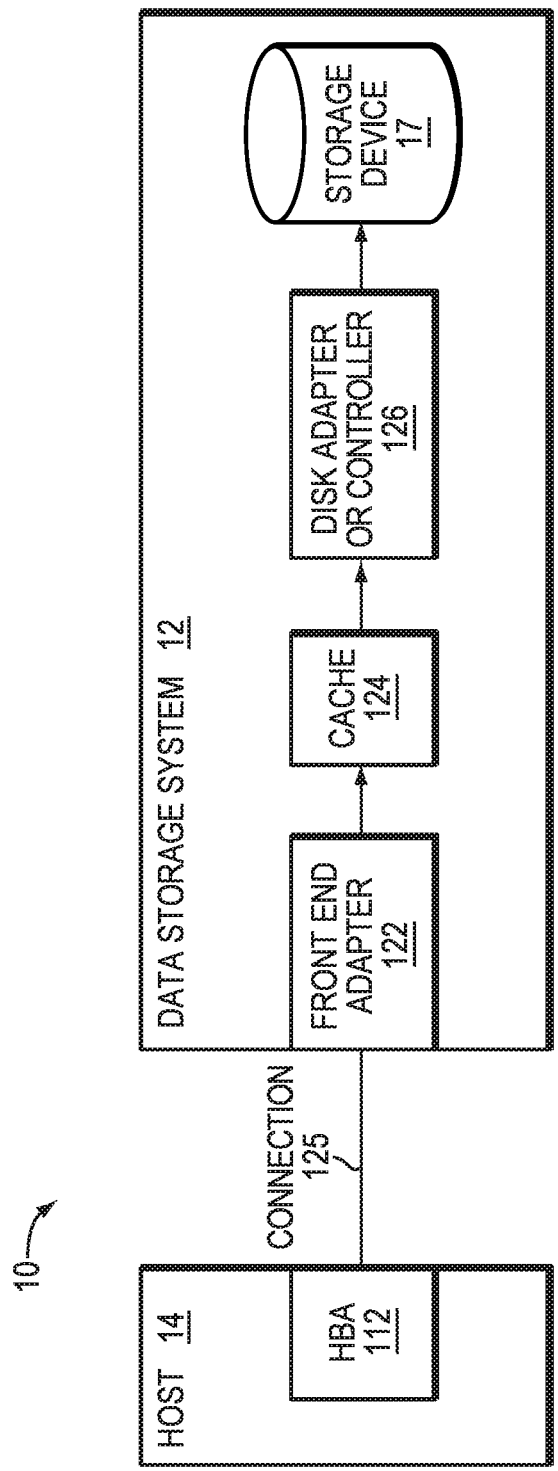

With reference to FIG. 2, shown is an example 10 illustrating components of a system that may be used in an embodiment in accordance with techniques herein. The example 10 includes a simplified view of components of a system as described above. The example 10 includes a host 14 with a Host Bus Adapter ("HBA") 112. The host 14 communicates with data storage system 12 over connection 125. Connection 125 may be, for example, a network connection between the HBA 112 and a front end adapter 122 of the data storage system 12. As described above, a front end adapter 122 may be, for example, a Fibre Channel Adapter ("FA") or other adapter which facilitates host communication. The data storage system 12 also includes a cache 124, a Disk Adapter ("DA") or storage controller 126 and one or more data storage devices 17 (e.g., rotating disks or solid state devices (SSDs) such as a flash drive).

Components of the data storage system 12, such as a Host Adapter ("HA"), which may communicate with a host may also be referred to as front end components. Within the data storage system 12, components, which may be characterized as backend components, communicate with a front end component. An example of a backend component is a DA. In connection with data storage systems such as by EMC Corporation, various types of directors or adapters may be implemented as a processor, or, more generally, a component that includes the processor. Examples of directors are disk adapters (DAs), host adapters (HAs), and the like.

One or more internal logical communication paths may exist between the DAs, the HAs, and the cache memory 124. An embodiment, for example, may use one or more internal busses and/or communication modules. For example, the cache memory 124 may be used to facilitate data transfers and other communications between the DAs and HAs in a data storage system.

Data storage system 12 may include a plurality of storage devices such as disk devices or volumes included in an arrangement consisting of n rows of disks or more generally, data storage devices, 17a-17n. In this arrangement, each row of disks may be connected to a disk adapter ("DA") or director responsible for the backend management of operations to and from, a portion of the data storage devices 17. In a data storage system such as by EMC Corporation, a backend DA may also be referred, to as a disk controller. The DA may perform operations such as reading data from, and writing data to, the physical devices which are serviced by the DA.

The host 14 may issue an I/O operation to the data storage system over connection 125. For example, the host may issue a write operation to write data to a portion of data storage device 17. In one embodiment., the data of the write operation may first be stored in cache 124 and then de-staged at a later point in time by DA 126 to the data storage device 17. The foregoing host write operation is an example of an I/O operation of the type described above issued by the client. The single client I/O operation may result in actually writing data to one or more storage devices depending on how the device to which the I/O is directed is configured. When performing a read I/O operation received by the front end adapter 122, processing may first determine whether the data requested is already in cache 124 (thereby resulting in a cache hit or read hit). If the requested read data is in cache 124, the data is retrieved from cache 124 and returned to the host 14. Thus, a read resulting in a cache hit may be serviced without having to access the data storage device 17 for the data. If the requested data is not in cache 124, the data is retrieved by the DA 126 from the storage device 128, stored in cache 124, and then returned by the front end adapter 122 to the host 14.

Examples of cache 124 may include but are not limited to a volatile, solid-state, cache memory system (e.g., a dynamic RAM cache memory system) and/or a non-volatile, solid-state, cache memory system (e.g., a flash-based, cache memory system).

As described in more detail in following paragraphs and figures and with reference to FIG. 1, each of the SPs 114A, 114B may have its own instance of a data model, such as a object model, that represents various logical and physical aspects of the data storage configuration. The data model may include objects representing physical and logical entities in the data storage system. For example, objects may exist in the model representing the data storage system configuration whereby the objects may represent physical entities such as the physical drives (PDs) and logical entities such as a RAID Group, a LUN, and the like.

Figure 3:
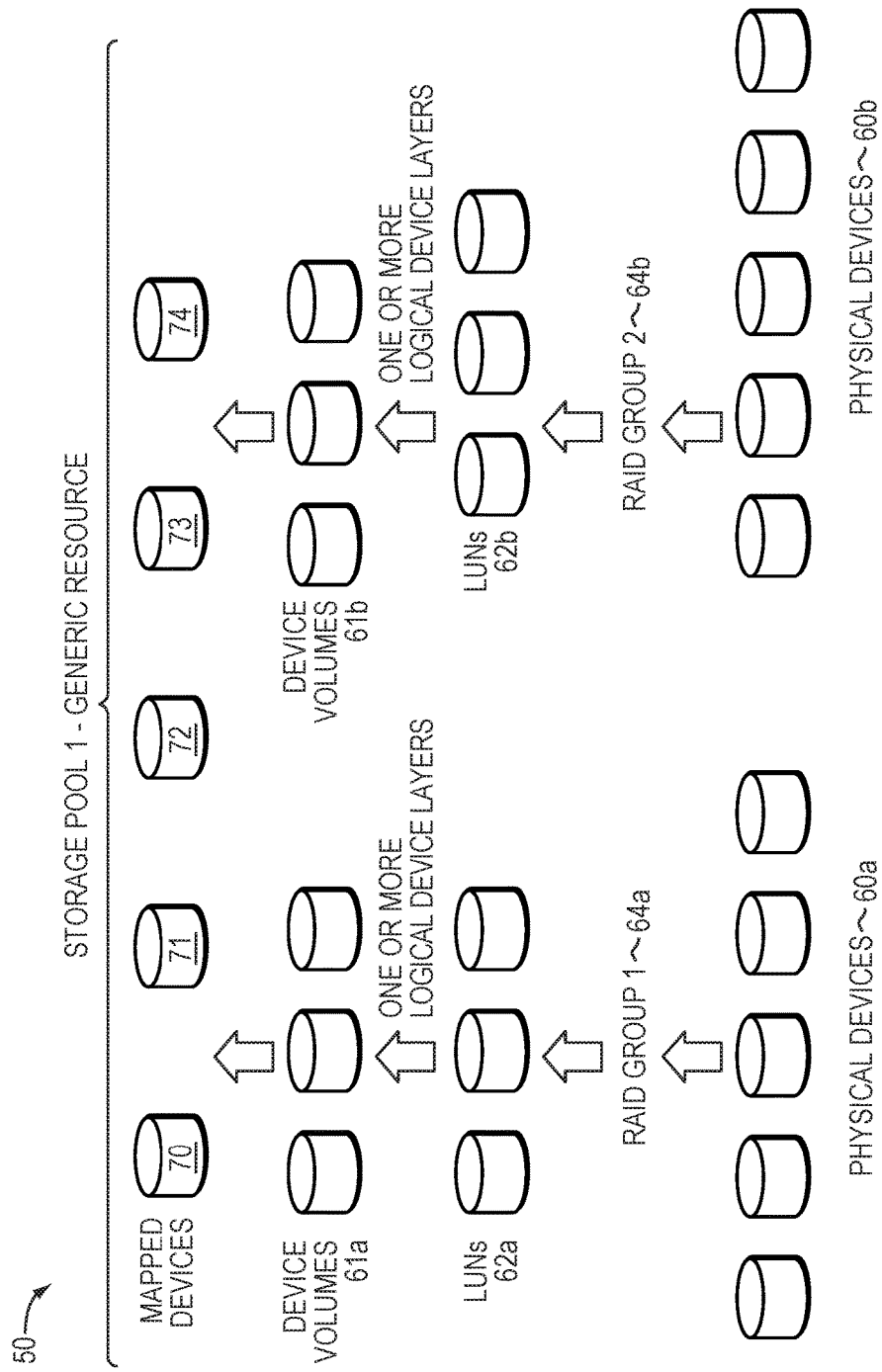
FIG. 3 is an example illustrating storage device layout.

Referring to FIG. 3, shown is an example representing how data storage system best practices may be used to form storage pools. The example 50 illustrates how storage pools may be constructed from groups of physical devices. For example, RAID Group1 64a may be formed from physical devices 60a. The data storage system best practices of a policy may specify the particular disks and configuration for the type of storage pool being formed. For example, for physical devices 60a on a first data storage system type when forming a storage pool, RAID-5 may be used in a 4+1 configuration (e.g., 4 data drives and 1 parity drive). The RAID Group 1 64a may provide a number of data storage LUNs 62a. An embodiment may also utilize one or more additional logical device layers on top of the LUNs 62a to form one or more logical device volumes 61a. The particular additional logical device layers used, if any, may vary with the data storage system. It should be noted that there may not be a 1-1 correspondence between the LUNs of 62a and the volumes of 61a. In a similar manner, device volumes 61b may be formed or configured from physical devices 60b. The storage pool 1 of the example 50 illustrates two RAID groups being used to define a single storage pool although, more generally, one or more RAID groups may be used for form a storage pool in an embodiment using RAID techniques.

The data storage system 12 may also include one or more mapped devices 70-74. A mapped device (e.g., "thin logical unit", "direct logical unit") presents a logical storage space to one or more applications running on a host where different portions of the logical storage space may or may not have corresponding physical storage space associated therewith. However, the mapped device is not mapped directly to physical storage space. Instead, portions of the mapped storage device for which physical storage space exists are mapped to data devices such as device volumes 61a-61b, which are logical devices that map logical storage space of the data device to physical storage space on the physical devices 60a-60b. Thus, an access of the logical storage space of the mapped device results in either a null pointer (or equivalent) indicating that no corresponding physical storage space has yet been allocated, or results in a reference to a data device which in turn references the underlying physical storage space. A disk may be a physical disk within the storage system. A LUN may be a logical unit number which is an identifier for a Logical Unit. Each slice of data may have a mapping to the location of the physical drive where it starts and ends.

Figure 4:
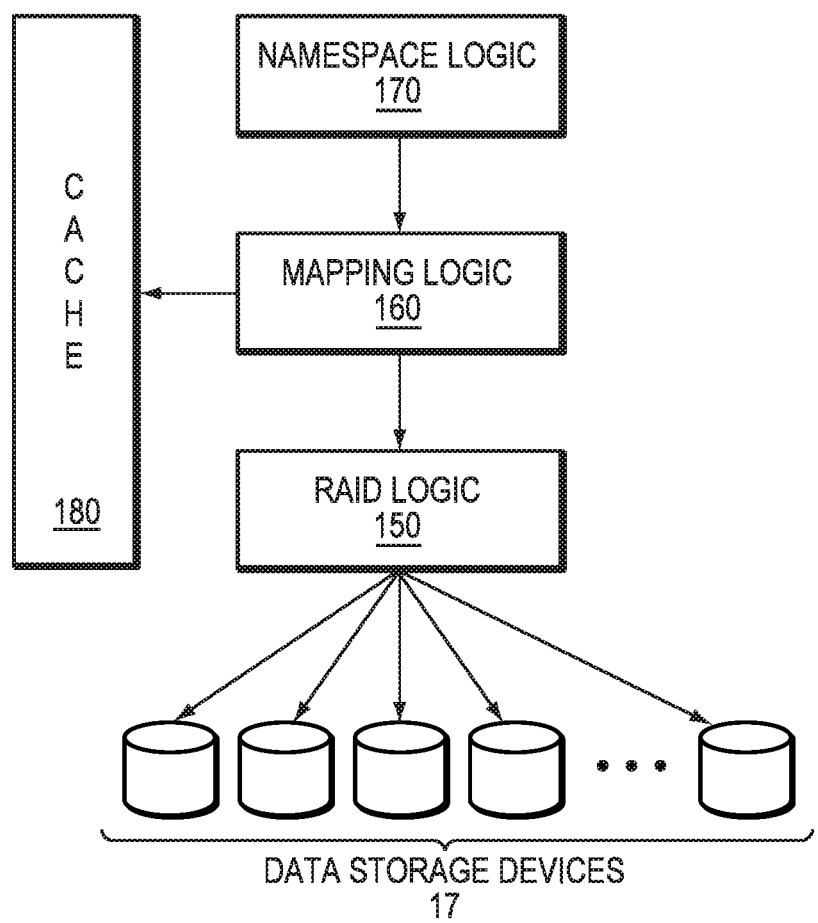
FIGS. 4-6 are diagrams illustrating in more detail components that may be used in connection with techniques herein.

Referring to FIG. 4, shown is more detailed representation of components that may be included in an embodiment using the techniques herein. With reference also to FIGS. 1-3, namespace logic component 170 exports LUNs to a host and mapping logic component 160 (also referred to herein as "mapper") presents storage extents to namespace logic component 170 for provisioning storage space from the storage extents to a LUN presented to a host by namespace logic component 170. Thus, mapping logic component 160 provides an address space for storage space to namespace logic component 170 for provisioning storage to a LUN from this address space. Further, RAID logic component 150 (also referred to herein as simply "RAID" or "RAID logic") consumes storage from data storage devices 17 and provides such storage in form of tiers to mapping logic component 160 which further provides such storage as a storage extent to the namespace logic component 170. Thus, mapping component 160 interacts with RAID logic component 150 and allocates storage space from tiers provided by RAID logic 150 and presents such tiers as a storage extent to namespace component 170. In at least one embodiment of the current technique, mapping logic component 160 sends a request to perform a RAID storage operation to RAID logic component 150 in accordance with techniques described herein. In at least some systems, for example, host 14 sends an I/O request through HBA 112 to data storage system 12. Based on the I/O request, data storage system 12 sends corresponding data requests to data storage devices 17 through DA 126 and RAID logic component 150 where RAID logic component 150 is leveraged to provide management and access to storage of data storage devices 17. Mapper 160 sends I/O requests to RAID 150 and RAID 150 uses backend components to perform the I/O requests. Further, a monitor component performs functions such as rebuild of drives, cleaning, and provisioning new storage. The monitor component (also referred to herein as simply "monitor") interfaces with RAID 150 and mapper 160 for performing functions supported by the monitor component.

In at least one embodiment of the technique, RAID 150 provides a flat address space of storage for each tier in a storage system. Further, each tier may be presented as a separately addressable volume. The number of tiers may vary in a storage system, for example Hard Disk Drive ("HDD"), Solid-State Drive ("SSD") (NAND), and SSD tiers. Further, each tier that is exported provides additional storage (also referred to herein as "spare") for overprovisioning to pre-allocate storage space for fixing drive failure ("also referred to herein as "self-healing") after a drive fails. Further, each tier is able to dynamically increase in size as additional drives are added to a storage system.

For example, if a storage system includes a SSD tier with 100 disk drives of 1 Terabytes (TB) capacity for each disk drive, RAID 150 reserves a portion of this storage space for RAID protection and sparing and exports the remaining storage space for use. In such an example, 1% of the total storage space provided by a disk of 1 Terabytes (TB) capacity in a RAID group may be reserved and 99 TB of storage space may be exported for use such that 99 TB of storage space is completely accessible by a client and the client is able to read data from and write data to this storage space as soon as the disk is exported to the client. When a tier is initially created, RAID 150 apportions each disk drive into a set of disk stripes and such disk strips may be of a large size (e.g., gigabytes).

In at least one embodiment of the current technique, a tier is a storage object that RAID 150 provides to clients of RAID 150 (e.g., mapper 160). Further, a tier may comprise of a set of uber stripes where each uber stripe of the set of uber stripe is associated with a plan for describing layout of data organized on respective uber stripe. Further, a disk stripe is a storage extent created from a disk drive. Generally, a disk drive is apportioned to a set of disk stripes which may be of a large size such as in the order of gigabytes (GB) in size. For example, if a storage system includes a disk drive of size 200 gigabytes (GB), the disk drive may be apportioned into around 200 disk stripe. Further, a RAID map presents storage information for a set of uber stripes as that is the granularity used by the RAID map. A set of disk stripes are organized as an uber stripe which describes a storage extent. For example, if a disk drive includes 5 disk stripes, such disk stripes may be organized together to create a RAID-5 based 4+1 uber stripe that may represents 4 GB of logical space. Thus, an uber stripe may be of a large size, for example, in the order of gigabytes (GB). Further, each uber stripe may comprise of smaller RAID stripes, and such strips may be of a small size (e.g., 4 megabytes (MB)) as a client generally accesses a smaller RAID stripe when performing read and/or write operations. Thus, while an uber stripe is a large sized stripe, in the order of gigabytes (GB) (e.g., 4 GB in the example above), a RAID stripe is a small sized stripe, in the order of megabytes (MB) (e.g., 4 MB in the example above).

Figure 5:
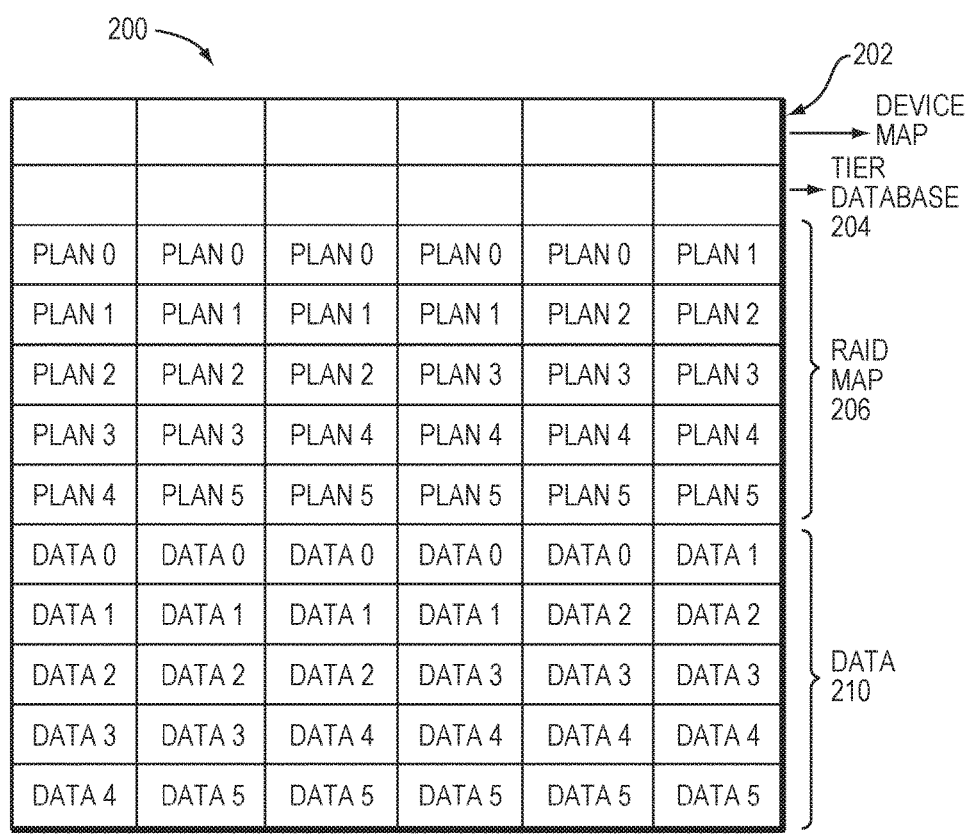

Referring to FIG. 5, shown is more detailed representation of components that may be included in an embodiment using the techniques herein. With reference also to FIGS. 1-4, in at least one embodiment of the current technique, RAID map 206 comprises of a set of plan entries where each plan entry corresponds to an uber stripe which maps a user's logical block address for data 210 in a logical address space to a specific set of disk stripes. Further, each plan included in RAID map 206 describes a set of disk stripes and RAID geometry associated with the set of disk stripes. For example, as illustrated in FIG. 5, a plan may indicate a set of 5 disk stripes that are organized together to represent a RAID-5 based 4+1 uber stripe.

Further, an uber stripe for a tier may be created by selecting a set of free disk stripes such that data is distributed across each disk drive in a tier to ensure that each disk drive used within the uber stripe is unique.

In at least one embodiment of the current technique, RAID map 206 includes persistent metadata regarding mapping information which is used by RAID 150 to describe the storage layout of a set of tiers. Further, RAID map 206 is dynamically discovered and described in a storage system. Further, each entry in RAID map 206 is referred to herein as a plan which describes layout of an uber stripe. A plan may describe information such as logical block address ("LBA") within a tier, the RAID type, the number of drives, and a set of disk stripes indicated by drive ID and offset. Thus, the RAID map 206 describes the specific layout (or plan) of a specific uber stripe organized on backend disks.

Further, in at least one embodiment of the current technique, a plan for an uber stripe may include information such as logical block address of the uber stripe within a tier, RAID type (e.g., RAID-6), width indicating the number of drives in the stripe, RAID geometry indicating layout of data (e.g., element size and elements per parity), drive extents indicating the offset on a disk drive and device ID, and the state indicating the current status of the plan (such as unmapped, resources required).

Further, in at least one embodiment of the current technique, tier database 204 tracks information such as tier capacity regarding each tier which enables RAID 150 to track information regarding each tier even when a few or none of the disk drives of a tier resides in the tier.

Further, in at least one embodiment of the current technique, device map 202 includes mapping information for a disk drive such that the mapping information includes an association of a drive serial number with a drive ID. The drive ID for a disk drive is used in a plan to identify disk drives that are included in the plan. A device map 202 for a set of drives in a tier is read at the time a storage system is initialized. Further, device map 202 is stored persistently across a set of drives in a tier and is updated when new disk drives are added to a storage system. Further, in at least one embodiment of the current technique, a plan included in RAID map 206 for an uber stripe is written within metadata of a disk stripe (also referred to herein as "disk stripe metadata"). Further, disk stripe metadata is mirrored across each disk drive included in the uber stripe at the end of the uber stripe. Further, disk strip metadata may also include information indicating whether an uber stripe is allocated or not. For example, a portion (e.g., 64 kilobytes) of each disk stripe is reserved for disk stripe metadata. Further, for example, for a 8+2 RAID-6 plan, RAID plan information is mirrored across all 10 drives thereby achieving redundancy for the RAID plan by distributing plan information across each drive included in the RAID plan and by having an ability to self-discover the plan of a storage system.

FIG. 5 illustrates an example RAID map 206 in which a tier includes 6 disk drives with a RAID stripe size of 5. Further, drive header may include device map 202 which is mirrored across each disk drive of the tier. Further, tier database 204 which is also mirrored across each disk drive of the tier includes information regarding each tier in a storage system. Further, disk stripe metadata of a disk stripe includes plan information required for the disk stripe. Thus, for example, in FIG. 5, RAID map 206 on each disk drive includes plan entries for each plan associated with a respective disk drive. For example, plan-0 resides on drives 0, 1, 2, 3, and 4. However, plan-1 resides on drives 5, 0, 1, 2, and 3. Thus, by reading contents of just one disk stripe a storage system is able to discover information regarding remaining disk stripes in an uber stripe. Further, data 210 may be written in data stripes that span across different disk drives.

Figure 6:
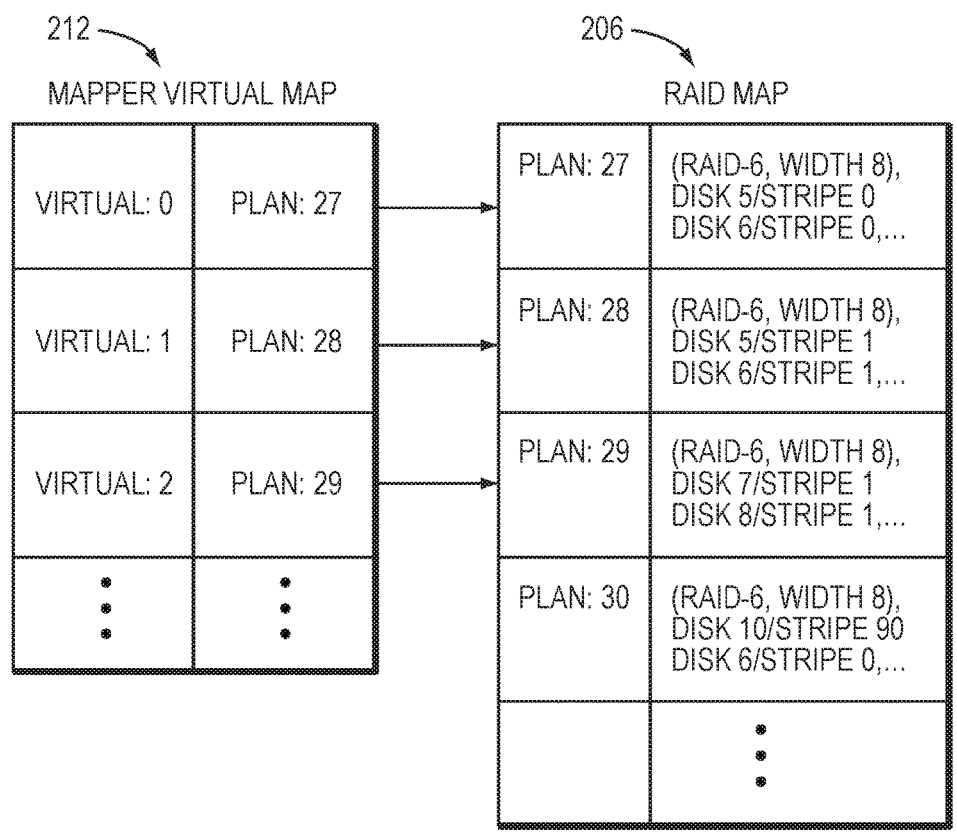

Referring to FIG. 6, shown is more detailed representation of components that may be included in an embodiment using the techniques herein. With reference also to FIGS. 1-5, a virtual map 212 used by mapper 160 is associated with a set of plans. Further, mapper 160 stores the plan number for a specific virtual map. For example, as illustrated in FIG. 6, mapper virtual map includes information regarding a set of plans (e.g., plan-27, plan-28, and plan-29). Further, each of these plans is for a specific uber stripe and resides in RAID map 206.

Further, in at least one embodiment of the current technique, following paragraphs describes various operations performed by RAID 150 in a storage system by using the current techniques described herein.

First such operation is an "unmap" operation which allows an uber stripe to be unmapped. Thus, an uber stripe may be unmapped such that RAID 150 reclaims storage space associated with the uber stripe in order to reallocate and rearrange the uber stripe as composition of a tier changes. For example, when a drive either fails or become unavailable, RAID 150 may need to reclaim uber stripes for the drive in order to create new plans that are not in degraded state. Further, for example, when new drives are added to a tier, RAID 150 may need to reclaim uber stripes in order to redistribute storage to include the new drives. For example, a user may decide to physically remove a drive from a RAID group. This may be done to reseat a drive, for load balancing purposes, debugging purposes, or a number of other reasons. The drive may also have been accidently removed where the user intended to remove a different drive. Alternatively, a drive may appear to have been removed in the event a cable came lose or is accidently removed or other path interruption.

Further, a "fix" operation may be performed on a plan as a result of drive rebalancing or drive failure situation which enables RAID 150 to change layout of a RAID stripe.

In at least one embodiment of the current technique, a plan included in RAID map 206 may be in either one of the following states:

"Normal"—indicates that the plan is in condition for use. This is the initial state for a plan since the time entire tier is initially allocated.

"Resource needed"—indicates that an uber stripe associated with the plan is required to be updated to a new plan. This state is cleared once sufficient resources become available.

"Sync needed"—indicates that the plan number is required to be synchronized across the plan indicating the need to ensure that the plan is same across the entire uber stripe.

"Unmapped"—indicates that the plan has been unmapped such that storage resources previously used by the plan are available for use.

In at least one embodiment of the current technique, when a tier is initially exported for use, the entire address space of the tier is available for use indicating that no restrictions are placed regarding which portions of the address space may be used. Further, prior to performing any read or write operation, a determination is made regarding which plan to use for a specific RAID stripe by querying the RAID Map 206 which requires a look-up of the current plan for the current uber stripe associated with the specific RAID stripe.

Further, when a disk drive fails, RAID 150 reports information regarding uber stripes for which plan information is required to be synchronized. Further, a monitor component may be responsible for changing the plan of a set of uber stripes by first querying RAID 150 to find out the state of each RAID stripe which maps to one or more blocks of data. Further, when a plan for an uber stripe is changed, the monitor component indicates to the mapper 160 to perform the "fix" operation. RAID logic 150 upon receiving a fix operation updates the organization of a RAID stripe. Further, mapper 160 updates the plan number for a specific virtual map associated with the plan in the mapper virtual map 212.

Further, as described above herein, RAID logic 150 maintains a portion of each disk stripe which is not bound to a set of uber stripes which enables RAID logic 150 to manage drive failures by immediately being able to use disk stripes to create new non-degraded plans so that the mapper 160 is able to perform writes. During a degraded condition, RAID 150 starts to use free disk stripes. However, it may be possible that RAID 150 may run low on free disk stripes or run out of free disk stripes resulting into an out of disk stripe condition.

Further, when RAID 150 does run low on free disk stripes, RAID 150 indicates an out of disk stripe condition by setting the "resource needed" state in a plan for uber stripes that require resources in order to be written with a new plan. This state indicates that a plan cannot be written with a new, non-degraded plan until more storage resources are made available. Then, the monitor component starts to unmap uber stripes by using the mapper 160 in order to enable more write operations. An unmap operation indicates to RAID 150 that a specific uber stripe is no longer in use such that RAID 150 updates a map associated with the uber stripe to indicate that the plan has been unmapped. RAID 150 then redistributes the disk stripes to other plans that require such disk stripes.

Further, the monitor detects when new uber stripes required to be mapped. For example, when a new drive is added to a storage system, the new uber stripes are mapped and capacities of such new uber stripes are exported for use.

In at least one embodiment of the current technique, when a storage system starts and initializes, RAID 150 initializes each tier and creates a RAID map 206. For a full stripe write operation performed by mapper 160 on a stripe, mapper 160 send a request to RAID 150 to determine the current plan number for the stripe. RAID 150 performs a lookup in the RAID map 206 to determine the plan number and plan information for the uber stripe which is then validated by RAID 150.

It should again be emphasized that the technique implementations described above are provided by way of illustration, and should not be construed as limiting the present invention to any specific embodiment or group of embodiments. For example, the invention can be implemented in other types of systems, using different arrangements of processing devices and processing operations. Also, message formats and communication protocols utilized may be varied in alternative embodiments. Moreover, various simplifying assumptions made above in the course of describing the illustrative embodiments should also be viewed as exemplary rather than as requirements or limitations of the invention. Numerous alternative embodiments within the scope of the appended claims will be readily apparent to those skilled in the art. Furthermore, as will be appreciated by one skilled in the art, the present disclosure may be embodied as a method, system, or computer program product. Accordingly, the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

The flowchart and block diagrams in the FIGs illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the FIGs. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for use in managing storage device mappings in storage systems, the method comprising:
    creating a dynamic mapping describing a layout of data across a distributed storage system by creating a set of mappings in the distributed storage system, wherein the distributed storage system stores data in a redundant manner at more than one location on a set of storage devices by using a set of stripes, each stripe of the set of stripes indicating a data slice stored on a storage device of the set of storage devices, wherein each mapping of the set of mappings identifies information regarding location of data on the storage device for a stripe, wherein the dynamic mapping is updated without having to rebuild a storage device of the set of storage devices enabling the distributed storage system to dynamically map any stripe of the set of stripes in a tier across any storage device within the tier and at any offset within the tier, wherein a storage object is presented to a user for storing data on the storage device, wherein the storage object is the tier and includes a set of disk drives, wherein the tier includes a set of uber stripes, each uber stripe of the set of uber stripes describes a storage extent, wherein a set of disk stripes are organized as an uber stripe, wherein a disk stripe is a storage extent created from a set of disk drives, wherein each uber stripe includes a set of RAID stripes, wherein a plan is used for creating the set of mappings, wherein the plan is associated with an uber stripe and describes layout of data on the uber stripe, wherein the plan identifies a set of disk drives of the set of disk drives of the tier and offsets within a specific RAID stripe of the uber stripe, wherein the plan is persistently stored on each disk drive included in the specific RAID stripe; and
    storing the mapping on the set of storage devices.

2. The method of claim 1, wherein a RAID map is used for managing the set of mappings, wherein the RAID map includes a set of plans associated with a set of uber stripes.

3. The method of claim 1, further comprising:
    dynamically changing a mapping of the set of mappings, wherein changing the mapping enables the distributed storage system to map any stripe of the set of stripes within the tier to any offset within the tier.

4. The method of claim 1, further comprising:
    managing the set of mappings by using a device map, wherein the device map is stored persistently on the distributed storage system, wherein the device map includes mapping information for a set of disk drives, wherein the mapping information includes an association of a drive serial number of a disk drive with a drive ID of the disk drive.

5. The method of claim 1, further comprising:
    managing the set of mappings by using a tier table, wherein the tier table is stored persistently on the distributed storage system, wherein the tier table includes information regarding each tier organized on the distributed storage system.

6. The method of claim 1, further comprising:
managing the set of mappings by using a virtual map, wherein the virtual map includes a set of plans.

7. The method of claim 1, wherein the distributed storage system further comprises a plurality of Redundant Array of Inexpensive Disks (RAID) systems, each RAID system of the plurality of RAID systems having a first disk drive and a second disk drive.

8. A system for use in managing storage device mappings in storage systems, the system comprising a processor configured to:
create a dynamic mapping describing a layout of data across a distributed storage system by creating a set of mappings in the distributed storage system, wherein the distributed storage system stores data in a redundant manner at more than one location on a set of storage devices by using a set of stripes, each stripe of the set of stripes indicating a data slice stored on a storage device of the set of storage devices, wherein each mapping of the set of mappings identifies information regarding location of data on the storage device for a stripe, wherein the dynamic mapping is updated without having to rebuild a storage device of the set of storage devices enabling the distributed storage system to dynamically map any stripe of the set of stripes in a tier across any storage device within the tier and at any offset within the tier, wherein a storage object is presented to a user for storing data on the storage device, wherein the storage object is the tier and includes a set of disk drives, wherein the tier includes a set of uber stripes, each uber stripe of the set of uber stripes describes a storage extent, wherein a set of disk stripes are organized as an uber stripe, wherein a disk stripe is a storage extent created from a set of disk drives, wherein each uber stripe includes a set of RAID stripes, wherein a plan is used for creating the set of mappings, wherein the plan is associated with an uber stripe and describes layout of data on the uber stripe, wherein the plan identifies a set of disk drives of the set of disk drives of the tier and offsets within a specific RAID stripe of the uber stripe, wherein the plan is persistently stored on each disk drive included in the specific RAID stripe; and
storing the mapping on the set of storage devices.

9. The system of claim 8, wherein a RAID map is used for managing the set of mappings, wherein the RAID map includes a set of plans associated with a set of uber stripes.

10. The system of claim 8, further comprising:
dynamically change a mapping of the set of mappings, wherein changing the mapping enables the distributed storage system to map any stripe of the set of stripes within the tier to any offset within the tier.

11. The system of claim 8, further comprising:
manage the set of mappings by using a device map, wherein the device map is stored persistently on the distributed storage system, wherein the device map includes mapping information for a set of disk drives, wherein the mapping information includes an association of a drive serial number of a disk drive with a drive ID of the disk drive.

12. The system of claim 8, further comprising:
manage the set of mappings by using a tier table, wherein the tier table is stored persistently on the distributed storage system, wherein the tier table includes information regarding each tier organized on the distributed storage system.

13. The system of claim 8, further comprising:
manage the set of mappings by using a virtual map, wherein the virtual map includes a set of plans.

14. The system of claim 8, wherein the distributed storage system further comprises a plurality of Redundant Array of Inexpensive Disks (RAID) systems, each RAID system of the plurality of RAID systems having a first disk drive and a second disk drive.

* * * * *